US010279931B2

(12) United States Patent
Brewer et al.

(10) Patent No.: US 10,279,931 B2
(45) Date of Patent: May 7, 2019

(54) HYBRID ABLATIVE THERMAL PROTECTION SYSTEMS AND ASSOCIATED METHODS

(71) Applicant: The Boeing Company, Chicago, IL (US)

(72) Inventors: Bryan Clark Brewer, Garden Grove, CA (US); Patrick Jacob Mobers, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 444 days.

(21) Appl. No.: 15/004,456

(22) Filed: Jan. 22, 2016

(65) Prior Publication Data
US 2016/0325857 A1    Nov. 10, 2016

Related U.S. Application Data

(62) Division of application No. 12/550,793, filed on Aug. 31, 2009, now Pat. No. 9,283,711.

(51) Int. Cl.
*B64C 1/38* (2006.01)
*B64G 1/58* (2006.01)
*B64G 1/62* (2006.01)
*B29C 65/48* (2006.01)

(52) U.S. Cl.
CPC ............ *B64G 1/58* (2013.01); *B29C 65/4835* (2013.01); *B64C 1/38* (2013.01); *B64G 1/62* (2013.01)

(58) Field of Classification Search
USPC ..... 428/920; 427/387, 447; 442/79, 82, 132, 442/297.4
See application file for complete search history.

(56) References Cited

U.S. PATENT DOCUMENTS

| | | | |
|---|---|---|---|
| 3,723,481 A | 3/1973 | Bobear | |
| 3,875,106 A | 4/1975 | Lazzaro | |
| 4,031,059 A | 6/1977 | Strauss | |
| 4,077,921 A | 3/1978 | Sharpe et al. | |
| 4,594,368 A | 6/1986 | Salyer et al. | |
| 4,595,714 A | 6/1986 | McAllister et al. | |
| 4,848,869 A | 7/1989 | Urruti | |
| 5,064,868 A | 11/1991 | Simpson et al. | |
| 5,316,834 A * | 5/1994 | Matsuda | B32B 5/26 442/247 |
| 5,661,198 A | 8/1997 | Inatani et al. | |
| 5,976,997 A * | 11/1999 | Meaney | B32B 15/06 156/307.3 |
| 6,383,623 B1 | 5/2002 | Erb, Jr. | |
| 6,627,697 B2 | 9/2003 | Barney et al. | |
| 6,638,883 B2 | 10/2003 | Gaffney et al. | |
| 8,007,888 B2 | 8/2011 | Sangouard et al. | |
| 9,283,711 B1 * | 3/2016 | Brewer | B29C 65/4835 |

* cited by examiner

*Primary Examiner* — Lynda Salvatore
(74) *Attorney, Agent, or Firm* — Armstrong Teasdale LLP

(57) ABSTRACT

A method of forming a thermal protection system for high speed aircraft is described. The method includes mechanically working an uncured ablator material into a first surface of a felt layer such that the ablator material penetrates a distance into a thickness of the felt layer thereby forming an region that has a mixture of felt and ablator material, adding additional uncured ablator material to the worked ablator material, and curing the combined ablator material.

20 Claims, 4 Drawing Sheets

HYBRID ABLATIVE THERMAL PROTECTION SYSTEMS AND ASSOCIATED METHODS

CROSS REFERENCE TO RELATED APPLICATIONS

This application is a divisional and claims priority to U.S. patent application Ser. No. 12/550,793 filed Aug. 31, 2009, and issued as U.S. Pat. No. 9,283,711 on Mar. 15, 2016, for "HYBRID ABLATIVE THERMAL PROTECTION SYSTEMS AND ASSOCIATED METHODS", which is hereby incorporated by reference in its entirety.

BACKGROUND

The field of the invention relates generally to ablative materials, and more specifically to a hybrid ablative thermal protection system.

Ablative materials have been used in a variety of applications to protect and insulate structures that are subjected to extreme thermal conditions. For example, many aerospace vehicles that traverse, exit, and enter the atmosphere of the Earth travel at high velocities, and as a result, their exterior aerosurfaces, and to some degree their substructure, experience high aerothermal loads. Aerothermal loads have been managed using a variety of techniques including insulation, radiant cooling, active cooling, conduction and convective cooling, and by phase change or ablative materials. Generally, ablative materials are applied to the affected aerosurfaces to absorb the extreme heat in order to insulate the vehicle from the thermal environment.

The thermal management technique of ablation has been widely used for a variety of applications since the early 1930s. Ablative materials were used in early rocket systems for nose cap protection and have also been used as re-entry heat shields on the Gemini and Apollo space vehicles, and further on many modern rocket nozzles. Many of these materials, although suitable for use in the aforementioned applications, have handling and longevity issues that preclude application on a system that is subjected to frequent handling and that may be stored for several years prior to use.

Known ablative materials comprise a variety of constituent components, each at certain percentages by weight or volume, to achieve the desired level of thermal protection and other physical properties. Generally, ablator compositions are a composite material comprising a resin matrix with a variety of filler materials to reduce the overall density or provide other physical properties.

Certain ablative compositions have included a variety of other constituent elements such as metal fillers, colloidal clay fillers, boron and oxygen compounds, polyurethane resins, a mixture of both epoxy and polysulfide resins, and many others too numerous to detail herein. The known art compositions, however, include numerous fillers to achieve a desired set of properties such as thermal, mechanical, and others. As a result, such compositions may be costly and difficult to fabricate with a relatively large number and variety of fillers. In addition, many known art ablator compositions demonstrate relatively low thermal and abrasion resistance performance under high heat flux and pressure loads, for example, as observed in Mach 6 to 8 vehicles.

Ablators with high shear, high heat flux capabilities generally have high densities. Lightweight thermal protection systems cannot withstand high shear, high heat flux environments. Accordingly, there remains a need in the art for an ablator composition that is reduced in weight from known ablative solutions that also improves thermal performance. Such an ablator would be low in density yet high in abrasion resistance and durability before, during, and after high thermal loads. The preferred ablator would also be relatively low cost and simple to fabricate.

BRIEF DESCRIPTION

In one aspect, a method of forming a thermal protection system for high speed aircraft is provided. The method includes mechanically working an uncured ablator material into a first surface of a felt layer such that the ablator material penetrates a distance into a thickness of the felt layer thereby forming an region that has a mixture of felt and ablator material, adding additional uncured ablator material to the worked ablator material, and curing the combined ablator material.

In another aspect, a thermal protection system for high speed aircraft is provided. The thermal protection system includes a felt layer comprising a first side, a second side, and a thickness separating the sides, the first side operable for attachment to a structure of the aircraft using an adhesive, and a layer of ablator material, a portion of the ablator material mechanically worked into the thickness of the felt layer from the second side prior to the curing of the ablator material.

The features, functions, and advantages that have been discussed can be achieved independently in various embodiments of the present invention or may be combined in yet other embodiments further details of which can be seen with reference to the following description and drawings.

DETAILED DESCRIPTION

The disclosed embodiments are directed to application of an ablator material, for example, Boeing lightweight ablator (BLA), to a needled felt of Nomex fibers, creating a dual component ablative thermal protection system. Nomex is a registered trademark of E. I. du Pont de Nemours and Company. The described configuration reduces structure temperature and thermal protection system weight compared to BLA only applications.

Figure 1:
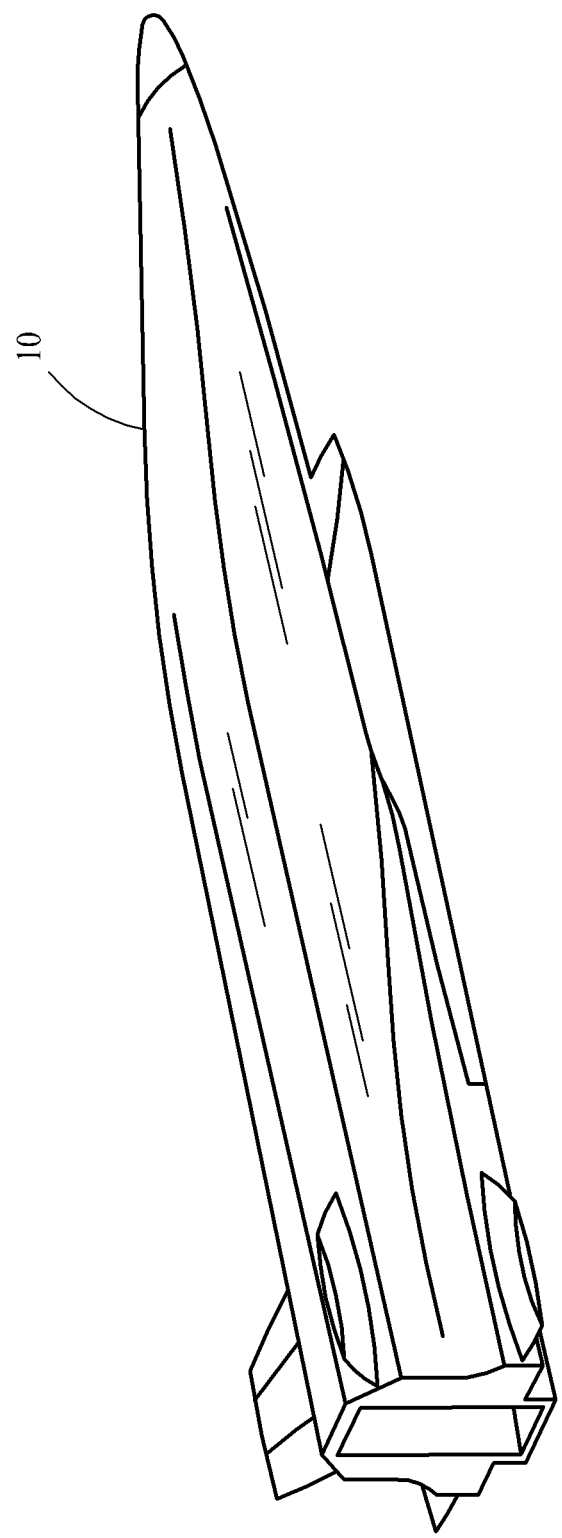
FIG. 1 is a perspective view of an aerospace vehicle capable of traveling at high speed (greater than Mach 1) through the atmosphere of the Earth.

Referring to the drawings, the ablator composition of the present invention is applied to the exterior surfaces of an aerospace vehicle as illustrated and generally indicated by reference numeral 10 in FIG. 1. The aerospace vehicle 10 is shown flying through the atmosphere of the Earth, where high acceleration and velocities create extremely elevated thermal loads across the exterior surface, or aerosurface, of the vehicle 10. Accordingly, the ablator composition 20, shown in FIG. 2, provides thermal protection for the vehicle 10 during these extreme thermal conditions.

Figure 2:
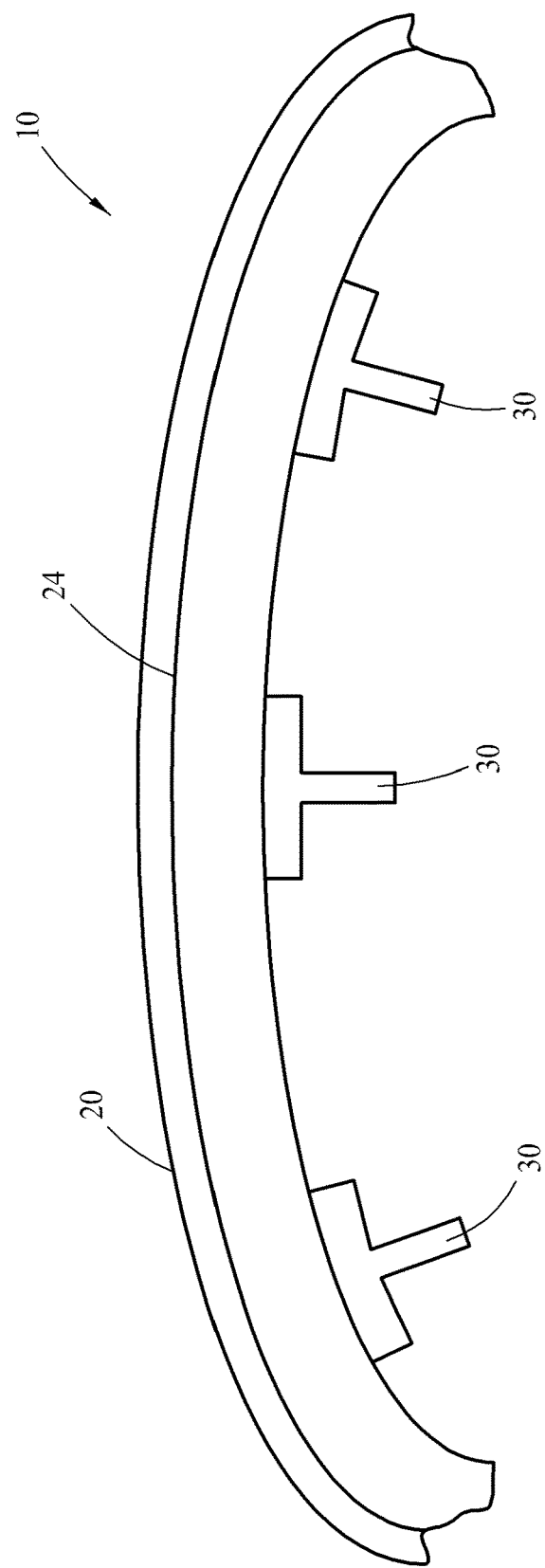
FIG. 2 is a cross-sectional view of an ablator composition formed on a structure of the aerospace vehicle of FIG. 1.

Referring specifically to FIG. 2, the ablator composition 20 is shown applied to a portion of the outer mold line (OML) 24 of the aerospace vehicle 10. In addition to protecting the OML 24, the ablator composition 20 further provides protection to substructure 30 adjacent the OML 24. Accordingly, additional structure and/or systems within close proximity of the OML 24 are protected from the extreme thermal environment by the ablator composition 20.

The application of the ablator composition 20 to an aerospace vehicle 10 as described herein should not be construed as limiting, rather this application is merely illustrative of one structure and one operating environment in which the described embodiments have utility. The ablator composition 20 described herein can further be employed with a wide variety of structures and systems that must withstand high thermal loads for an extended duration.

Figure 3:
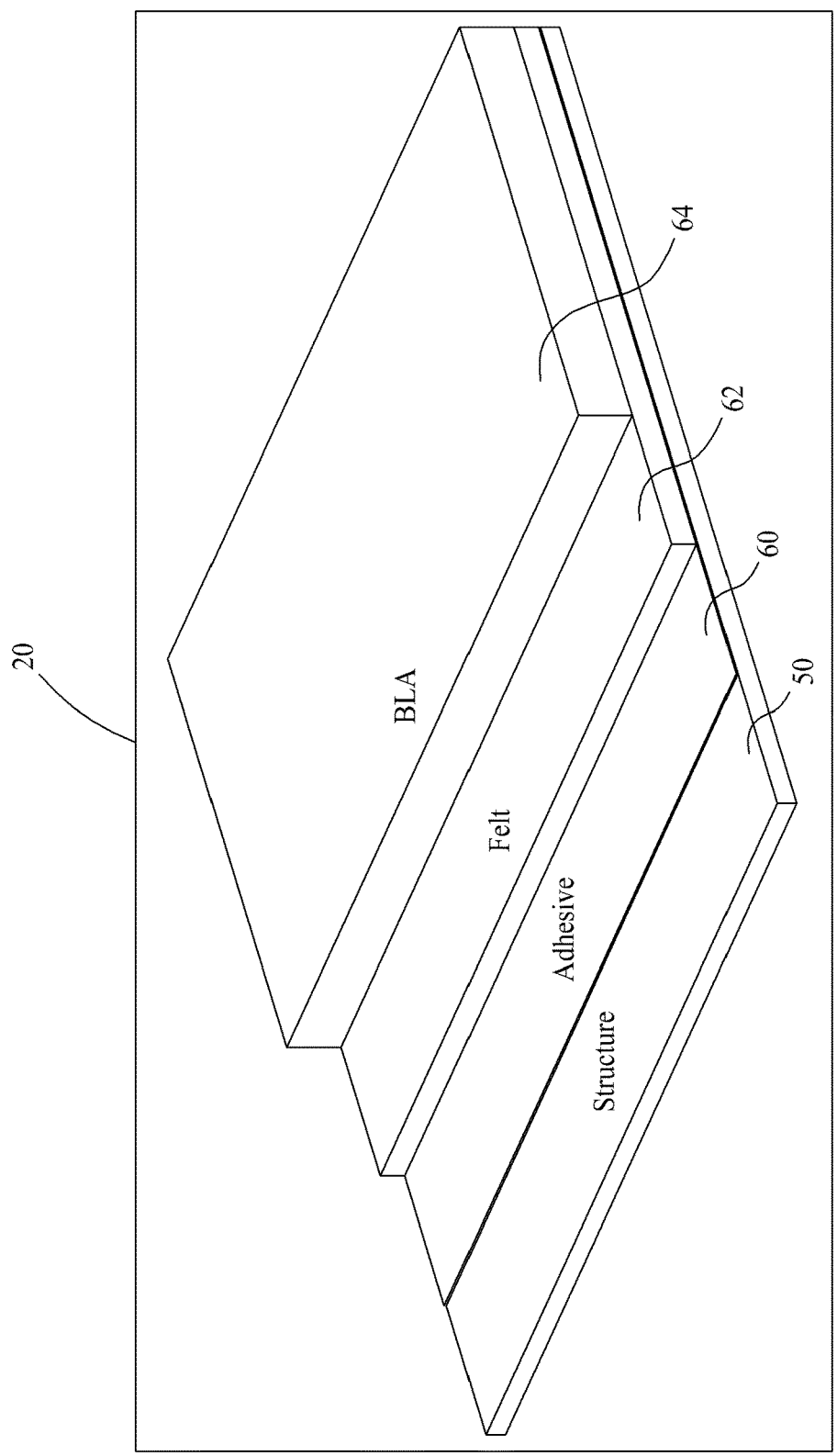
FIG. 3 is an illustration of the components of the ablator composition of FIG. 2.

Now referring to FIG. 3, specific layers of the ablator composition 20 are shown and referenced to a structure 50, for example, the outer moldline 24 of vehicle 10. The layers include an adhesive layer 60 that is applied directly to the structure 50, a felt layer 62 that is applied to the adhesive 50, and a Boeing lightweight ablator (BLA) layer 64. In one embodiment, the felt layer 62 is felt reusable surface insulation (FRSI) that is heat treated. In one specific embodiment, the felt layer 62 of FRSI is about 0.160 inches in thickness.

In one embodiment, a process of fabricating the ablator composition 20 has been modified to improve the adherence between the felt layer 62 and the BLA layer 64, specifically to get an additional amount of the BLA layer 64 absorbed into the felt layer 62, thereby increasing the mechanical lock between the two layers.

Figure 4:
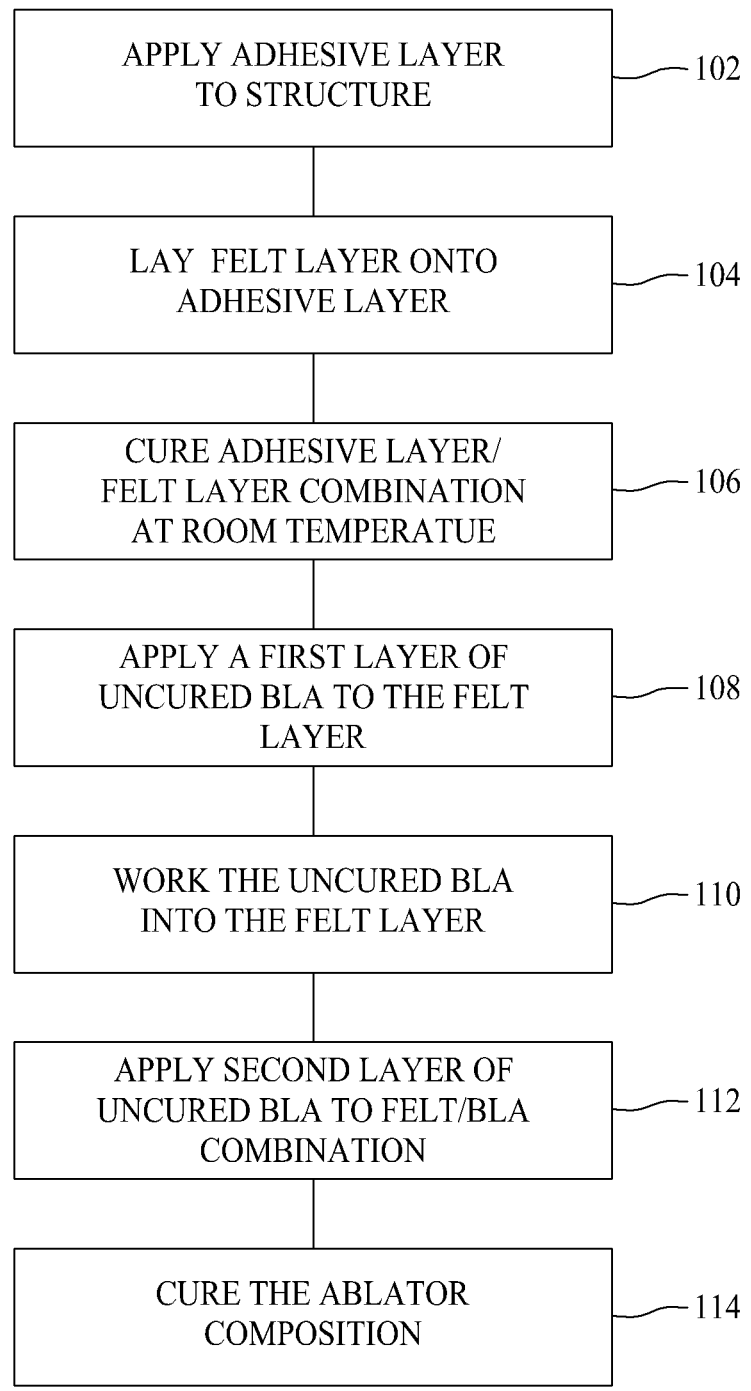
FIG. 4 is a flowchart describing a process for assembling a thermal protection system that contains the ablator composition shown in FIG. 3.

FIG. 4 is a flowchart 100 illustrating the process of fabricating the ablator composition. Specifically, the adhesive layer 60 is applied 102 to the structure 50, for example, an aluminum panel. The felt layer 62 is then laid 104 onto the adhesive layer 60. In one embodiment, pressure is applied to the felt layer 62 to improve adhesion between the adhesive layer 60 and the felt layer 62. The adhesive layer 60—felt layer 62 interface is cured 106 at room temperature. After curing, a first layer of uncured BLA 64 is applied 108 to the felt layer 62. The uncured BLA 64 is then worked 110 into the felt layer 62 as further described below. After the working 110 step, a second layer of uncured BLA is applied 112 to the felt layer 62-BLA 64 combination. As only a portion of the first BLA layer is worked in the felt layer 62, and since the second layer of BLA 64 is applied 112 before the first layer of BLA 64 is cured, these are shown as a single layer of BLA in FIG. 3. After application 112 of the second layer of BLA 64, the composition 20 is cured as further detailed in the following paragraphs. Application of the BLA, in one embodiment, is accomplished using a spraying process.

Working 110 the BLA-felt interface, in one embodiment, includes moving the nomex fibers of the felt layer 62 in several directions and causing rotation of these felt fibers so the BLA is, or can be, worked into the felt. In one specific application, the felt layer 62 is needled, for example using a spreading tool, so that the nomex fibers present a more porous surface to the BLA. During the application of the BLA to the felt layer 62, a needle or other needle like device may be utilized as a depth gauge to check thickness. Specifically, by stabbing the needle through the uncured BLA and felt layer 62 until it bottoms out on the substrate, a thickness of the combination may be determined. In an alternative embodiment, the felt layer 62 is needled prior to application of the BLA to the felt layer 62. In this alternative embodiment, the manufacturer of the felt layer 62 moves the nomex fibers of the felt layer 62 in several directions as described above. Subsequently, during application of the BLA, the needle is utilized as a depth gauge to check thickness as described above.

In one specific application, the BLA is worked into the felt layer 62 to a depth of about 0.03 to about 0.04 inches. In one embodiment, the BLA is thinned, for example using a solvent, prior to the mechanical working of the ablator material (BLA).

The curing of the BLA layer 64 includes curing at an ambient temperature for up to about 24 hours followed by an oven curing step. In one particular application, the oven curing process includes raising the temperature, from ambient to about 180 degrees Fahrenheit, at a rate of about 10 degrees per hour. The ablator composition is maintained at the increased curing temperature for up to 48 hours. The increased curing temperature causes a high temperature bond line to be formed between the felt and the BLA. This bond line is sometimes referred to as a mechanical lock between the BLA and the felt fibers. At least one result of the above described processes is that after the BLA has hardened, gets charred through use (producing silica), there is still a mechanical lock between the felt and the BLA.

In the above described process, the felt of the felt layer 62 traps solvent of the BLA. The trapping of solvent by the felt layer 62 is an undesired by product of the described processes. This trapped solvent tends to cause problems in curing of the felt layer/BLA interface predominantly by not allowing the BLA to fully cure. The development of the above described curing method has been added to the fabrication of the ablative composition to produce a successful bond between the BLA and the felt layer 62. If the BLA is not fully cured, the thermal protection system will have underperforming mechanical properties. Therefore, the solvent has to be released from the thermal protection system. However, if the solvent is driven off too quickly it can cause a separation in the BLA/felt layer bondline due to the volatiles expanding faster than can be permeated through the BLA, which results in blisters within the uncured BLA. The specific slow cure process described in the preceding paragraph, with the slowly escalating temperature allows the solvent to be slowly flashed out of the BLA, without causing delaminations The thickness of the felt layer 62 and the thickness of the BLA 64 are selected based on the particular application. In one embodiment, the BLA is a silicon ablator, filled with a commercial filler, and is described in U.S. Pat. No. 6,627,697, the disclosure of which is incorporated by reference. The described structure of ablator material worked into felt and subsequent curing provides an ablator that exhibits high shear and high heat flux capabilities, and the use of the felt layer helps reduce weight of the resulting dual component ablative thermal protection system as compared to BLA only ablator systems.

Referring back to FIG. 3, the combination of the adhesive layer 60, the felt layer 62, and the BLA layer 64 are generally formed on a structure 50, as described herein. In practice, such a structure is generally a panel of an air vehicle. Upon curing of the ablator material, the panel may be attached to a vehicle frame. Before or after attachment, the cured ablative material may be milled to a desired thickness, for example, as required by the application.

The described embodiments illustrate the combination of the high shear and high heat flux capabilities of BLA with the low aerial weight and low thermal conductivity characteristics of a needled felt layer, for example, of nomex fibers.

The manufacturing method creates a mechanical bond between the BLA and the felt that can withstand a higher use temperature than secondarily bonded BLA. As such, the embodiments combine a low thermal conductivity and low weight thermal protection system component with a high heat flux and high shear capable ablator. The improvement over the prior art occurs because the addition of the needled felt lowers the weight of the thermal protection system while maintaining the high heat flux and high shear capabilities.

Summarizing the described embodiments, the needled felt layer, for example, felt reusable surface insulation (FRSI) is bonded to the carrier structure with appropriate adhesive. In one specific application, RTV 560 is the preferred adhesive. BLA, thinned with OS-10 or other thinning fluid to aid in application, is manually pressed and worked into the felt surface fibers until a continuous layer of BLA is present in the felt. Before the BLA in the felt fibers is allowed to flash or cure, a second layer of BLA is then spray applied to the felt to achieve the desired overall thermal protection system thickness. The material is cured via room temperature and/or a heat cycle. The BLA surface is then machined to a desired outer mold line profile.

The addition of the needled felt of nomex fibers lowers an overall thermal conductivity of the described thermal protection system, which reduces backface temperature capabilities of the thermal protection system. Further, the felt is a lower weight material than BLA and its addition lowers the weight of the system when compared to BLA only thermal protection systems. The application technique, consisting of pressing the BLA into the felt surface to create a layer of BLA imbedded in the felt, provides a mechanical bond between the BLA and felt that when cured that can withstand a higher temperature than an adhesive bond between BLA and a structure. Simply, the BLA may get more brittle over time and the felt provides a type of strain relief function for the BLA. More specifically, the BLA will get more brittle during the dynamic heating conditions associated with flight. For example, the BLA becomes less elastic and more ceramic like when temperatures start to exceed 800 degrees Fahrenheit. The BLA characteristics do not change over time at room temperatures or at temperatures less than 500 degrees Fahrenheit.

The described embodiments provide a high heat flux, low density ablator capable of operating in a high shear environment. The use of a dual component thermal protection system uses the optimal performance characteristics of two different materials (felt and an ablator material such as BLA) to provide a dual component material with the best possible performance. The combination saves weight and decreases outer mold line thickness while maintaining a lower structure temperature, allowing hypersonic vehicles to fly faster and further since weight requirements are easier to meet and overall drag requirements are reduced.

The above described embodiments are especially suited for use upon a surface of a high speed air vehicle that is commonly referred to as an acreage, which is roughly defined as a top of such a vehicle. However, applications on other vehicles and vehicle locations are contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal protection system for high speed aircraft comprising:
   a felt layer comprising a first side, a second side, and a thickness separating said sides; said first side operable for attachment to a structure of the aircraft using an adhesive;
   a first layer of silicone-based ablator material mechanically worked into the thickness of said felt layer from said second side prior to the curing of said ablator material, said first layer worked into the thickness of said felt layer at a depth less than the thickness of said felt layer such that the first side is free of silicone-based ablator material; and
   a second layer of silicone-based ablator material extending over said second side of said felt layer such that said first and second layers of silicone-based ablator material are combined.

2. A thermal protection system according to claim 1 wherein said first layer is worked into the thickness of said felt layer from said second side to a depth that ranges from about 0.03 inches to about 0.04 inches.

3. A thermal protection system according to claim 1 wherein a thickness of the ablator material and felt layer combination is verified using a needle like device as a depth gauge.

4. A thermal protection system according to claim 1 wherein said felt layer has a thickness of about 0.160 inches.

5. A thermal protection system according to claim 1 wherein said felt layer comprises nomex fibers worked to present a porous surface to said first layer of ablator material prior to curing.

6. A thermal protection system according to claim 1 wherein said first layer of ablator material is milled to a desired thickness after curing.

7. A thermal protection system according to claim 1 wherein said first layer of ablator material is thinned with a solvent prior to being worked into said felt layer, the solvent removed during a curing of said ablator material.

8. A thermal protection system according to claim 1 wherein said ablator material is cured at an ambient temperature for up to 24 hours, the curing temperature subsequently increased at about 10 degrees Fahrenheit per hour until the curing temperature is about 180 degrees Fahrenheit, the curing temperature maintained at approximately 180 degrees Fahrenheit for up to 48 hours.

9. A thermal protection system according to claim 1, wherein said second layer of silicone-based ablator material is extended over said second side of said felt layer prior to the curing of said first layer of silicone-based ablator material.

10. A thermal protection system according to claim 1, wherein said felt layer is fabricated from a lower weight material than said ablator material.

11. An aerospace vehicle comprising:
    a substructure;
    a thermal protection system coupled to said substructure, said thermal protection system comprising:
        a felt layer comprising a first side, a second side, and a thickness separating said sides; said first side attached to the substructure using an adhesive;

a first layer of silicone-based ablator material mechanically worked into the thickness of said felt layer from said second side prior to the curing of said ablator material; and a second layer of silicone-based ablator material extending over said second side of said felt layer such that said first and second layers of silicone-based ablator material are combined.

12. An aerospace vehicle according to claim 11 further comprising a layer of adhesive positioned between said substructure and said felt layer.

13. An aerospace vehicle according to claim 11, wherein said substructure is an aluminum panel.

14. An aerospace vehicle according to claim 11, wherein said substructure is an exterior panel of the aerospace vehicle.

15. An aerospace vehicle according to claim 11, wherein said first layer is worked into the thickness of said felt layer from said second side to a depth that ranges from about 0.03 inches to about 0.04 inches.

16. An aerospace vehicle according to claim 11, wherein said felt layer has a thickness of about 0.160 inches.

17. An aerospace vehicle according to claim 11, wherein said felt layer comprises nomex fibers worked to present a porous surface to said amount of ablator material prior to curing.

18. An aerospace vehicle according to claim 11, wherein said first layer of ablator material is thinned with a solvent prior to being worked into said felt layer, the solvent removed during a curing of said ablator material.

19. An aerospace vehicle according to claim 11, wherein said second layer of silicone-based ablator material is extended over said second side of said felt layer prior to the curing of said first layer of silicone-based ablator material.

20. An aerospace vehicle according to claim 11, wherein said felt layer is fabricated from a lower weight material than said ablator material.

* * * * *